July 15, 1969   W. M. POLLIT   3,455,338
COMPOSITE PIPE COMPOSITION
Filed June 19, 1967
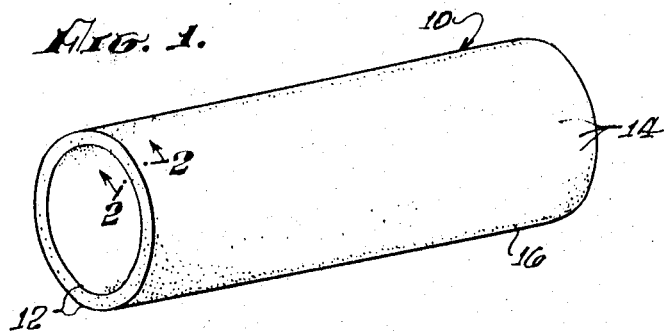
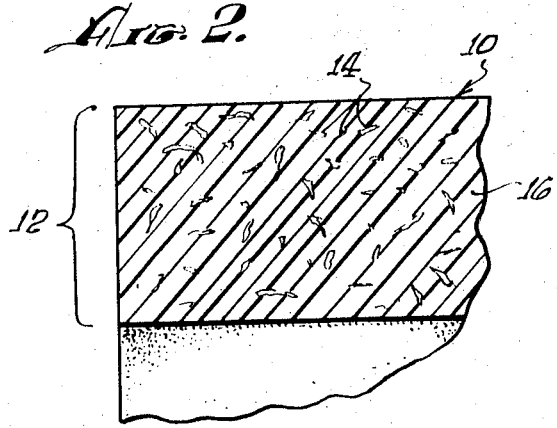
INVENTOR.
WALTER M. POLLIT,
By His Attorneys
Spensley & Horn.

3,455,338
COMPOSITE PIPE COMPOSITION
Walter M. Pollit, 555 S. Burlingame,
Los Angeles, Calif. 90049
Filed June 19, 1967, Ser. No. 646,906
Int. Cl. F16l 9/12
U.S. Cl. 138—178                                         4 Claims

ABSTRACT OF THE DISCLOSURE

A composite plastic pipe composition consisting essentially of one component which is a thermo-plastic polymer material having non-adhesive surface characteristics, that is surface characteristics wihch repell the attachment of adhesive substances, this characteristic is also termed non-sticking in the art. The second component comprises a plurality of fibres of a thermally conductive material. In the preferred embodiment of the invention, the polymer is polytetrafluoroethylene which is filled with randomly oriented short copper fibres. The plastic pipe composition finds utility in heat exchangers; due to the non-adhesiveness or non-stickness of the fluoroethylene polymer formation of surface scale is inhibited. The copper fibres or any other metal fibres randomly distributed in the resin matrix material serve both to provide excellent thermal conductivity and also to structurally strengthen the pipe. The pipe can be constructed by standard extruding or molding methods.

BACKGROUND OF THE INVENTION

Field of the invention

This invention relates primarily to a thermally conductive and/or electrically conductive composite plastic composition and particularly to a composite pipe having surface characteristics such that scale will not form thereon. The pipe is thus suitable for use in heat exchangers employed in the distillation of salt water by evaporative processes.

Prior art

One of the most serious problems in the desalinization of sea water or brackish water by evaporative processes is the deposition, on the surface of heat exchange units, of inorganic salts whose solubilities decrease with increasing temperatures; these are termed scale. When sea water or brackish water is evaporated, deposits of insoluble chemical compounds are formed which attach themselves to the surface of the heat exchanger, e.g. to steam pipes and tubes. The three major scale components of sea water are calcium carbonate, magnesium hydroxide and calcium sulfate. Below a sea water temperature of 180° F., calcium carbonate is the major scale component. At temperatures of above about 180° F. magnesium hydroxide is the major scale component. Calcium sulphate the third and most important scale component in the form of insoluble anhydrite ($CaSO_4$) and hemihydrate $$(CaSO_4 \cdot \tfrac{1}{2} H_2O)$$

as well as soluble gypsum ($CaSO_4 \cdot 2H_2O$) is deposited at an inverse ratio to the temperature of the water, at all temperautre ranges, its deposition increasing rapidly above 190° F. Calcium sulphate can be removed only by expensive mechanical means such as chiseling which necessitate additional costs and equipment shut-down over prolonged periods. The other major scale components in the desalinization of sea water are, of stated above, calcium carbonate ($CaCO_3$) and magnesium hydroxide ($Mg(OH)_2$). These two compounds can be dissolved and dealt with successfully in practice by addition of small amounts of sulphuric acid. However, even the causing of a very slight acidity (pH 5) increases the overall price of desalted water by three to four cents per thousand gallons. This on a large scale is extremely uneconomical. The formation of scale has probably been the biggest single handicap in the efficient conversion of sea water to potable water by evaporation. Because of the highly insulative properties of the scale as well as because the thickness of the scale deposit reduces the useful diameter of heat exchanger tubes the whole evaporation operation becomes thermodynamically inefficient after a short period of operation.

The magnitude of the scale problem can further be illustrated by mentioning that thermal conductivity of scale as low as 0.0012–0.0057 cal./sec./sq. cm./° C. has been measured. In comparison the thermal conductivity of pure Cu is 0.91 cal./sec./sq. cm./cm./° C. The heat transfer rate even in the presence of very thin layers of scale is thus drastically reduced.

Accordingly, it is a primary object of the present invention to provide a composite material for use in heat exchangers and the like upon which scale will not form when saline water is evaporated.

It is another object of the present invention to provide a composite material which is thermally conductive and electrically conductive yet upon whose surface scale will not form.

Yet another object of the present invention is to provide a composite pipe material which is thermally conductive, which is corrosion resistant both to concentrated brine and other chemicals and upon whose surface scale will not form.

Still another object of the present invention is to provide a composite pipe material comprising a thermo-plastic polymer having a non-adhesive surface and filled with randomly oriented fibres of a thermally conductive material.

Summary of the invention

In one of its broadest aspects the invention comprises a composite material consisting essentially of a first component of a thermo-plastic polymer material having a non-adhesive surface and a second component of a plurality of fibres of thermally conductive material. One of the preferred embodiments of the material composition consists essentially of a polytetrafluoroethylene polymer filled with randomly oriented copper fibres. This material composition can be extruded or formed by standard methods and then sintered or heat treated into a pipe or other configuration such that it can be used for example in heat exchangers for the desalinization of water. The composite plastic pipe having the described composition has unique non-adhesive surface characteristics. The scale usually associated with evaporation of sea water or brackish water cannot accumulate upon or attach to the surface of such pipe due to the non-stickiness of the pipe's surface.

One of the primary advantages of the present invention is that scale will not attach itself to the surface of the plastic pipe. The thermodynamic efficiency of the system is thereby greatly increased, since there is no insulating effect due to scale deposits.

Another advantage of the present material composition is that since no scale accumulates within pipes there is no clogging and consequent loss of effective carrying area of the pipes. Still another advantage of the present pipe composition is that because calcium sulfate does not attach itself to the pipe material the distillation can be conducted at temperatures in excess of presently used temperatures with an improvement in thermal efficiency of the process. Yet another advantage of the present invention is that it is no longer necessary to acidify the saline water to prevent calcium carbonate and magnesium hydroxide scale formation; thus there is a saving of sulfuric acid costs.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

Description of the drawing

FIGURE 1 is a perspective of a plastic pipe having the invented composition.

FIGURE 2 is a fragmentary enlarged section of the wall of a plastic pipe having the invented composition.

Description of the preferred embodiment

The composite material composition described herein has utility in many applications requiring the properties of thermal conductivity of the composite material, electrical conductivity, chemical inertness and non-adhesive surface characteristics, that is surface characteristics which repell the attachment of adhesive substances, this characteristic is also termed non-sticking in the art. Although not limited thereto, the present invention has been found to be particularly suited for use in a composite plastic pipe composition in heat exchangers for the desalinization of sea water by evaporative processes and will accordingly be described in connection with such use.

Referring now to FIGURES 1 and 2, plastic pipe 10 has a composition consisting essentially of two major components, one being a thermo-plastic resin 16 having non-adhesive surface characteristics and the other component constituting fibres 14 of a thermally conductive material. The pipe may be manufactured by standard molding or extruding techniques. The resinous component 16 of the pipe composition forms a matrix in which is imbedded a plurality of randomly oriented conductive fibres 14. The thermoplastic resin used must be able to withstand elevated temperatures which correspond to the temperatures of steam under pressure which is required for evaporative distillation processes. The resin must be corrosion resistant, and above all must have non-adhesive surface characteristics that inhibit the formation of chemical deposits and scales thereon. One of the major problems of distilling sea water to obtain potable water is the depositing of scale onto the surface of heat exchanger components such as pipes and tubing. This, of course, drastically reduces the thermodynamic efficiency of the system and reduces also the flow capacity of the pipes in use.

To inhibit the formation of scale, the thermoplastic polymer used in the present composition must have non-stick or non-adhesive surface characteristics. That is, the non-stick nature of the polymeric material is such that the scale will not attach itself to the walls either exteriorly or interiorly of the heat exchanger pipes. Some polymers which exhibit the desired non-adhesive surface characteristics and which have the other requisite mechanical and chemical properties to be used in the pipe material are polytetrafluoroethylene, such as Teflon which is manufactured by Polychemicals department of E. I. du Pont de Nemours & Co. (Inc.) or Plaskon-Halon manufactured by Allied Chemical Company, fluorinated ethylene propylene, in particular Teflon FEP manufactured by E. I. du Pont, Inc., and polyethyleneterephthalate copolymers. It is, of course, within the scope of the invention to employ any polymer which has the required non-adhesive surface characteristics and heat resistance required by this invention.

In the presently preferred embodiment of the invention polytetrafluoroethylene (hereinafter called Teflon) comprises a matrix material. Teflon when fabricated is chemically inert, has excellent heat resistance and corrosion resistance and has a non-adhesive surface; that is, most chemicals including those present in scale, will not attach themselves to its surface. In addition this material has good mechanical strength, including a tensile strength at 73° F. of between 4,000 to 6,000 p.s.i.; a tensile elongation at 73° F. of 300 to 400%; an impact strength (izod) at 73° F. of 3–4 foot pounds for inch, and a density of 2.1 gm./cm.$^3$. It has a static coefficient of friction under 20 pound load of (approximately) 0.04 and has a thermal conductivity of 0.00052 cal./sec./sq. cm./cm./° C. Because of their very low thermal conductivities polytetrafluoroethylene polymers have not been used as heat exchange material until very recently. Their utility in heat exchangers depends upon their chemical properties in conjunction with supplying large surface areas for heat exchange purposes; that is, large numbers of tubes having very thin walls and very small diameter, are used thus exposing a large surface area for heat exchange purposes. This increased surface area compensates for the very low thermal conductivity of the material itself. One of the important physical characteristics of this polymer as used in the present composition is the non-adhesive nature of its surface. It is most difficult for any substance to attach itself or to adhere to the surface of a Teflon structure. As a consequence, scale components do not form on pipes made of this material. These fluorocarbon resins are also chemically inert and do not react with, for example, concentrated geothermic or other brines or with acidic or alkaline solutions even under relatively severe environmental conditions of temperature and pressure. Thus, pipes made of this material are ideal for use as conduits for such liquids.

The resinous component of the composite pipe material is present in a range of from as little as 40% to as much as 85% by weight. In the preferred embodiment 60% resin is used.

The second component of the composite pipe composition is a filler of thermally conductive fibres 14. In the preferred embodiment of the invention these fibres are of a highly thermally conductive metal, and are distributed throughout the resin matrix. The fibres may be randomly distributed but can also be unidirectionally aligned if so desired. The fibres may be derived through drawing of wires or growing of whiskers or by any other means. Some of the metals and metal alloys that can be used as the fibre material in this composition are silver, gold, aluminum, magnesium, iron, steel, nickel, titanium, copper alloys and pure copper. From the standpoint of thermal conductivity and economics pure copper is the preferable material in this composition. Copper has a thermal conductivity "K" of 0.94 cal./sec./sq. cm./cm./° C. Silver has a thermal conductivity of 1.00 but is substantially higher in cost than copper. The other metals mentioned have substantially lower thermal conductivities, for example, metallic cupro-nickel tubes of a 70–30 Cu-Ni composition as commonly used in sea water conversion, have a thermal conductivity of 0.07 cal./sec./sq. cm./cm./° C. The addition of randomly oriented metallic fibres to the Teflon resin matrix in a predetermined percentage greatly increases the thermal conductivity of the resin. Although it has previously been known to add metallic powders to tetrafluoroethylene polymer materials this was done for the purpose of strengthening the fabricated structure; however, it has been found that surprisingly a metallic fibre incorporated into the resinous matrix increases the thermal conductivity of the resin to a much greater extent than does an equal percentage of finely divided metallic powder. This is thought to be due to an uninterrupted heat path between fibres. Whereas when a finely devided powder is used each particle is encapsulated and hence insulated from the others. At the same time the fibres serve to strengthen and to increase the tensile strength of the composite structure. The thermal conductivity of various cylindrical test samples of 1½ inches diameter times ⅝ inch in length of the invented composition and comparative compositions was measured by immersing the samples in an oil bath at 235° F. for various times and with thermocouples measuring the backside temperature of the samples at various time intervals. The comparative data obtained are tabulated in the table below.

TABLE

| Time (min.) | Thermocouple temperature, ° F. | | | | |
| --- | --- | --- | --- | --- | --- |
| | 100% Teflon | 10% Cu wire, 90% Teflon | 40% Cu powder, 60% Teflon | 40% Cu wire, 60% Teflon | Pure Cu |
| ½ | 100 | 101 | 102 | 107 | 128 |
| 1 | 105 | 106 | 111 | 122 | 157 |
| 2 | 120 | 122 | 134 | 162 | 193 |
| 4 | 150 | 159 | 173 | 198 | 221 |

The length and diameter of the fibres can be selected with reference to the mechanical strength required for the completed structure. Excellent results have been obtained when the fibre length varies from as little as 0.031 inch to as much as 0.375 inch. Using these lengths there is a trade-off between thermal conductivity of the composite material and the strength gained by adding the fibre to the matrix material. The diameter of the fibre used also must be considered in connection with the thermal conductivity required and the mechanical strength of the pipe. Optimization of the diameter of the fibres will depend on trade-offs between rapidly increasing costs of small diameter wires versus improved strength and conductivity. Excellent results have been obtained when the diameter of the metallic fibre are as small as 0.002 inch diameter (corresponding to an AWG number of 44). In the preferred embodiment of the invention copper wires 0.0056 diameter and ¹⁄₁₀ inch long have been found to give good results. The quantity of metallic fibres incorporated into the composition depends upon the thermal conductivity and strength requirements as well as temperature resistance requirements of the pipe versus cost considerations. Under normal operating conditions, copper fibres can be added from as little as 15% to as much as 60% by weight of the total composition, with concurrent resin percentages of 85% by weight to 40% by weight. A composite article having the above described composition has the very unique properties of concurrent thermal conductivity and scale repellancy. In addition the article has a high strength to weight ratio.

A composition plastic pipe 10 can be manufactured by first thoroughly mixing the constituent materials. Metallic fibres that have been cut from wire to required length or grown as whiskers are mixed with Telflon polymer which is generally supplied as a powder. Generally, high speed mechanical mixers are used. It is important to thoroughly disperse the metallic fibres throughout the resin powder. After mixing the Teflon TFE polymer with the copper fibres or whiskers, the powder is pre-compressed and sintered at standard temperatures of approximately 700° F.; it can then be ram extruded. An FEP (fluorinated ethylene propylene) composite on the other hand, may be melt extruded or screw extruded at considerably lower temperatures of approximately 400° F.

Although the above description has been made in connection with composite plastic pipes or tubes, it is, of course, possible to produce other configurations such as tubes having fins or hexagonal or octagon tubes.

It is also within the scope of the present invention to manufacture components where the properties of scale repellancy and electrical conductivity are simultaneously important. It is well known that a plastic material when loaded with metallic fibres becomes a good electrical conductor. When this characteristic is combined with the non-adhesive surface characteristics of Teflon (or other similar thermo-plastic materials) the resulting product is especially suited for use such as the element in home type evaporator-humidifiers. The scale formation caused by tap water calcium deposits on conventional elements (thus impairing their electrical and thermal conductivity) does not occur on the Teflon composite type elements. Composite pipes having the invented plastic composition can be manufactured in a wide variety of sizes. A convenient size for use in heat exchangers is 12 feet long by 1 inch outside diameter and wall thickness 0.100 inch. Of course thinner or thicker wall thickness may be used depending on thermal and strength requirements of the particular structure. In addition to two primary components of the composition, i.e., resin matrix and conductive fibres, other conventional additives such as graphite may be utilized to aid in the extruding or molding processes.

Examples

The following are some examples of various formulations of the present composition as used in a plastic pipe for heat exchangers.

(I)

| | Parts per hundred |
| --- | --- |
| Polytetrafluoroethylene (Teflon) | 60 |
| Copper fibres (0.0056 inch diameter by 0.10 inch long) | 40 |

(II)

| | |
| --- | --- |
| Polytetrafluoroethylene (Teflon) | 75 |
| Silver fibres (0.0025 inch diameter by 0.10 inch long) | 25 |

(III)

| | |
| --- | --- |
| Fluorinated ethylene propylene (Teflon FEP) | 60 |
| Copper fibres (0.0056 inch diameter by 0.15 inch long) | 40 |

(IV)

| | |
| --- | --- |
| Polytetrafluoroethylene (Teflon) | 60 |
| Copper fibres (0.0025 inch diameter by 0.035 inch long) | 39.5 |
| Additive (for better extruding ability, i.e., graphite) | 0.5 |

It is apparent from the foregoing that the invented pipe composition has many advantageous characteristics which make it well suited for use in heat exchangers and the like. One significant advantage of the composition is that scale such as calcium sulfate or magnesium hydroxide will not attach itself to the surface of a plastic pipe having such a composition, thus there is no insulative effect on the pipes. Another advantage of such a composite plastic pipe is that it has a surprisingly high thermal conductivity and is therefore well suited for use in heat exchangers. Yet another advantage of the invented composition is that it has a high degree of chemical inertness and is therefore ideal for use as a conduit for corrosive materials.

Although this invention has been disclosed and illustrated with reference to particular applications, the principles involved are susceptible of numerous other applications which will be apparent to persons skilled in the art.

What is claimed is:

1. A composite tubing material of high thermal conductivity and having a corrosion resistant, scale repellent surface consisting essentially of a thermo-plastic polymer matrix substance having dispersed therethrough a predetermined weight percentage of short fibres of a high thermal conductivity substance, wherein said short fibres have diameters ranging from 0.002 inch to 0.040 inch and wherein said fibre lengths range from 0.03125 inch to 0.375 inch.

2. The high thermal conductivity tubing material defined in claim 1, wherein said matrix substance is a fluorocarbon polymer and wherein said fibres are of a metallic substance and present within the range of from 15 through 60 weight percent.

3. The high thermal conductivity tubing material defined in claim 1, wherein said thermo-plastic polymer is selected from the group consisting of polytetrafluoroethylene, fluorinated ethylene-propylene, and polyethyleneterephthalate.

4. The method of forming a composite tubing of high thermal conductivity having a non-adhesive surface comprising the steps of:

mixing a powdered fluorocarbon polymer and short metallic fibres of high heat conductivity, said powdered fluorocarbon polymer being present in the range of 40% by weight to 85% by weight and said metallic fibres being present in a range of from 15% by weight to 60% by weight;

sintering the mixture; and forming the sintered mixture into the desired tubular configuration.

References Cited

UNITED STATES PATENTS 3,198,873   8/1965   Ryan et al.

OTHER REFERENCES

Modern Plastics Encyclopedia, 1955, p. 557.

LOUIS K. RIMRODT, Primary Examiner